United States Patent
Werner et al.

(10) Patent No.: US 10,972,182 B1
(45) Date of Patent: Apr. 6, 2021

(54) ELECTRONICALLY ADJUSTABLE ATTENUATION WRAP PLUG

(71) Applicant: International Business Machines Corporation, Armonk, NY (US)

(72) Inventors: John S. Werner, Fishkill, NY (US); Faezeh Gholami, Ridgewood, NJ (US); Noah Singer, White Plains, NY (US); John Torok, Poughkeepsie, NY (US); Arkadiy O. Tsfasman, Wappingers Falls, NY (US); Philip A. Sciuto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/014,170

(22) Filed: Sep. 8, 2020

(51) Int. Cl.
| | |
|---|---|
| *H04B 10/08* | (2006.01) |
| *H04B 10/079* | (2013.01) |
| *H04B 10/40* | (2013.01) |
| *H04B 10/114* | (2013.01) |

(52) U.S. Cl.
CPC ... *H04B 10/07955* (2013.01); *H04B 10/1143* (2013.01); *H04B 10/40* (2013.01)

(58) Field of Classification Search
CPC .......... H04B 10/0795; H04B 10/07955; H04B 10/40; H04B 10/0775; H04B 10/07957; H04B 10/0779

USPC ..... 398/135, 136, 137, 138, 139, 16, 22, 23, 398/24, 25, 28, 115, 30, 31, 33, 38; 385/89, 90, 92, 93, 147; 356/73.1
See application file for complete search history.

(56) References Cited

U.S. PATENT DOCUMENTS

| | | | | |
|---|---|---|---|---|
| 6,941,071 | B2 * | 9/2005 | Demsky | H04B 10/07 398/135 |
| 7,486,889 | B2 * | 2/2009 | Ain | H04B 10/0731 385/147 |
| 7,547,150 | B2 | 6/2009 | Downie | |
| 8,041,178 | B2 | 10/2011 | Lu | |
| 8,782,477 | B2 | 7/2014 | Klein | |
| 10,042,136 | B2 | 8/2018 | Reagan | |
| 2004/0136722 | A1 * | 7/2004 | Mahowald | H04B 10/2587 398/138 |
| 2007/0113133 | A1 | 5/2007 | Liu | |
| 2009/0031180 | A1 | 1/2009 | Cagno | |

FOREIGN PATENT DOCUMENTS

CN 101160542 B 10/2010

* cited by examiner

*Primary Examiner* — Hanh Phan
(74) *Attorney, Agent, or Firm* — Grant M. McNeilly (57) ABSTRACT

A method of using an adjustable attenuation fiber optic wrap plug ("AAFOWP") includes receiving initial data into a wireless module of the AAFOWP, wherein the initial data corresponds to an initial desired attenuation level that the first AAFOWP is to achieve. The method also includes moving, in response to receiving the initial data, an arm by an actuator to change a bend radius of an optical fiber wrap in the AAFOWP, thus adjusting an attenuation through the AAFOWP to the initial desired attenuation level.

20 Claims, 8 Drawing Sheets

ELECTRONICALLY ADJUSTABLE ATTENUATION WRAP PLUG

BACKGROUND

This disclosure relates generally to adjustable attenuation wrap plugs, and in particular, to a wrap plug with electronically adjustable attenuation.

A wrap plug (i.e., loopback plug) is commonly utilized to test fiber optic transceivers, where transmitted data (output) is looped back as received data (input) simulating a complete communications link utilizing a single device. The wrap plug is designed to provide a specific attenuation for signals that would have to travel a desired distance when implemented in an end product (e.g., server equipment). For testing a fiber optic link at the end product to ensure proper communication at multiple distances requires multiple wrap plugs of different attenuation levels, where a user has to physically swap out the multiple wrap plugs of different attenuation levels.

SUMMARY

According to an embodiment of the present disclosure, a method of using an adjustable attenuation fiber optic wrap plug ("AAFOWP") includes receiving initial data into a wireless module of the AAFOWP, wherein the initial data corresponds to an initial desired attenuation level that the first AAFOWP is to achieve. The method also includes moving, in response to receiving the initial data, an arm by an actuator to change a bend radius of an optical fiber wrap in the AAFOWP, thus adjusting an attenuation through the AAFOWP to the initial desired attenuation level.

According to another embodiment of the present disclosure, a method of using a fiber optic wrap plug ("FOWP") includes measuring a distance between a controlling wireless module and an FOWP wireless module, and determining a transceiver into which the FOWP is plugged into based on the distance and a database of transceiver positions.

According to another embodiment of the present disclosure, an adjustable attenuation fiber optic wrap plug ("AAFOWP") apparatus includes a first optical fiber port, a second optical fiber port, an optical fiber wrap extending between the first optical fiber port and the second optical fiber port, an optical fiber movement arm in contact with the optical fiber wrap, an actuator module connected to the optical fiber movement arm, and a wireless module communicatively connected to the actuator module. The first wireless module receives data corresponding to a desired attenuation level the adjustable attenuation fiber optic wrap plug apparatus is to achieve, the actuator module changes a position of the optical fiber movement arm, and changes to a position of the optical fiber movement arm change a bend radius of the optical fiber wrap thus adjusting an attenuation between the first optical fiber port and the second optical fiber port.

BRIEF DESCRIPTION OF THE SEVERAL VIEWS OF THE DRAWINGS

One or more aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Detailed embodiments of the present disclosure are disclosed herein with reference to the accompanying drawings; however, it is to be understood that the disclosed embodiments are merely illustrative of potential embodiments of the disclosure and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

The terminology used herein is for the purpose of describing particular embodiments only and is not intended to be limiting to the disclosure. As used herein, the singular forms "a", "an" and "the" are intended to include the plural forms as well, unless the context clearly indicates otherwise.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present disclosure, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present disclosure.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

Figure 1A:
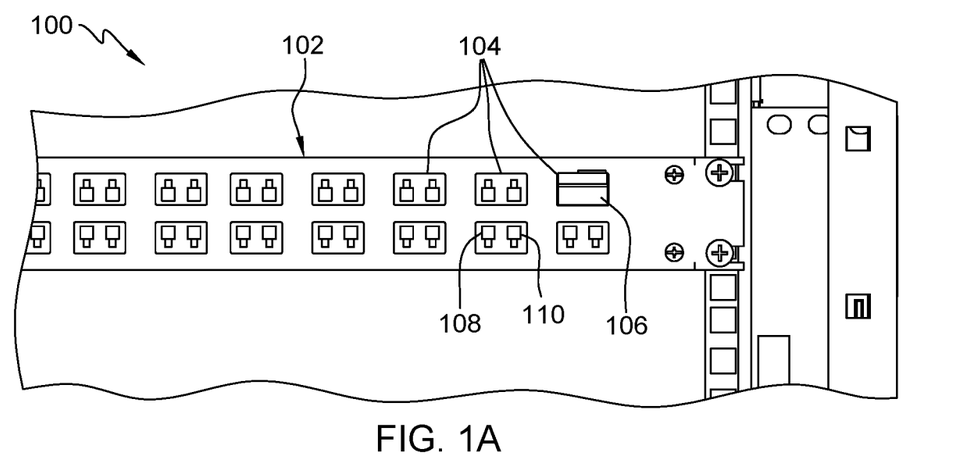
FIG. 1A depicts a front view of an adjustable attenuation wrap plug installed on an end product, in accordance with an embodiment of the present disclosure.

FIG. 1A depicts a front view of an adjustable attenuation wrap plug installed on an end product, in accordance with an embodiment of the present disclosure. In the illustrated embodiment, end product 100 represents server equipment (e.g., a fiber optic switch) with optical port panel 102 that includes multiple optical ports 104 with multiple input 108 and output 110 pairs. Adjustable attenuation fiber optic wrap plug 106 ("wrap plug") is inserted (i.e., plugged) into a single optical port 104 with a single input 108 and output 110 pair, where a loopback test is being performed on the single optical port 104. Wrap plug 106 is configured to route data transmitted from output 110 back to input 108 as received data, thus simulating a complete communication link (i.e. loop back). Wrap plug 106 is configurable to various attenuations to simulate signals requiring a desired distance of travel.

Figure 1B:
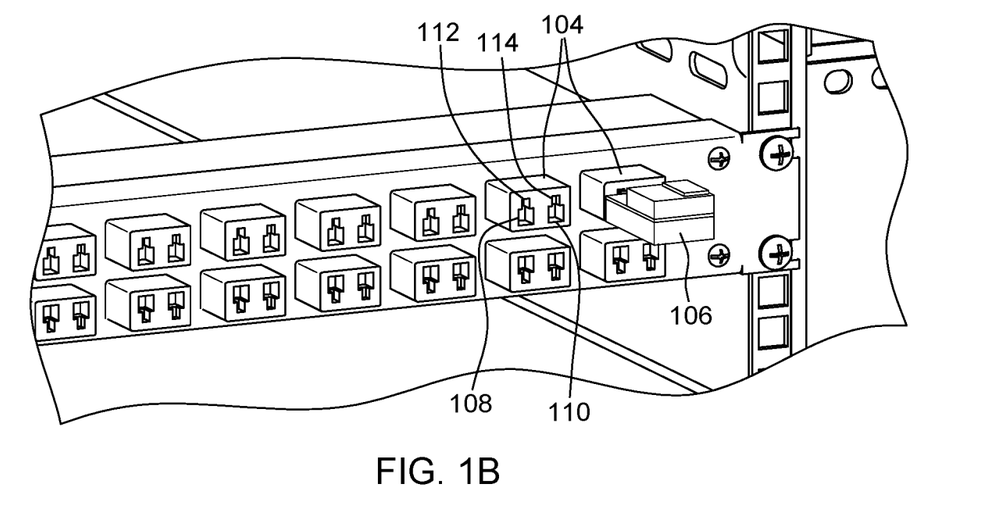
FIG. 1B depicts a 3-dimensional view of an electronically adjustable attenuation wrap plug installed on an end product, in accordance with an embodiment of the present disclosure.

FIG. 1B depicts a 3-dimensional view of an adjustable attenuation wrap plug installed on an end product, in accordance with an embodiment of the present disclosure. Dimensions of wrap plug 106 are such that multiple adjustable attenuation wrap plugs 106 can be inserted into respective optical ports 104 without interfering with one another. A user can insert adjustable attenuation wrap plug 106 into optical port 104 and the user, possibly using a test program, has the ability to set an attenuation level on wrap plug 106. If the attenuation level needs to be adjusted, the user and/or the test program can wirelessly communicate the change to wrap plug 106, which can physically execute the change. In this embodiment, wrap plug 106 is insertable into optical port 104 in a single orientation, where protruding compressible clips of wrap plug 106 align with corresponding input clip cavity 112 at input 108 and output clip cavity 114 at output 110. In other embodiments, wrap plug 106 does not have protruding compressible clips, allowing for wrap plug 106 to be inserted in two orientations.

Figure 2A:
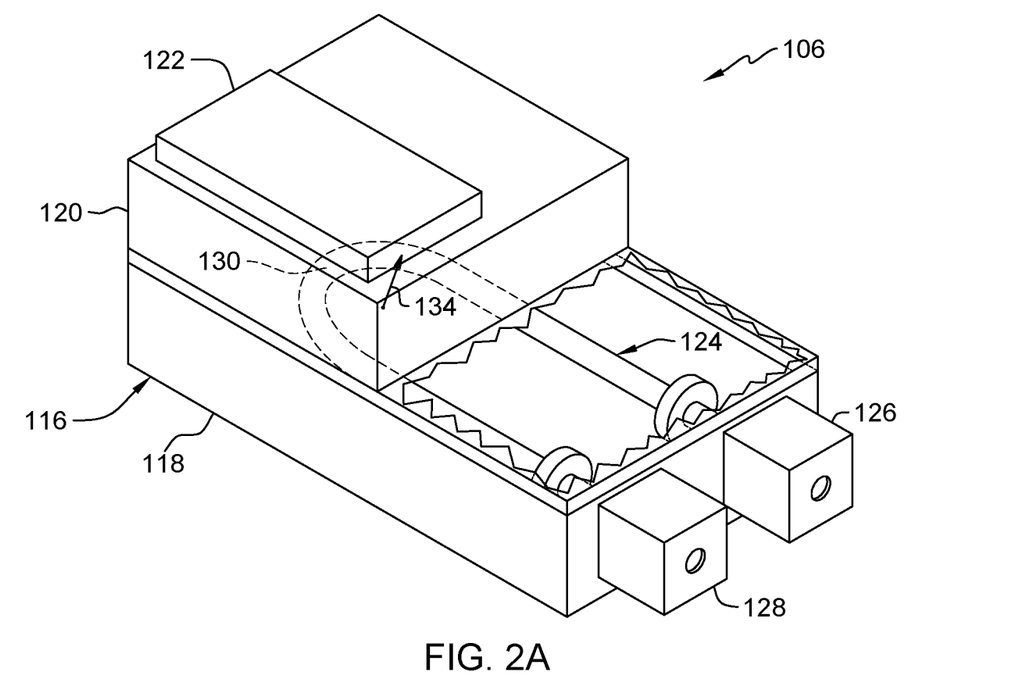
FIG. 2A depicts a 3-dimensional view of an electronically adjustable attenuation wrap plug in an undeformed state, in accordance with an embodiment of the present disclosure.
Figure 2B:
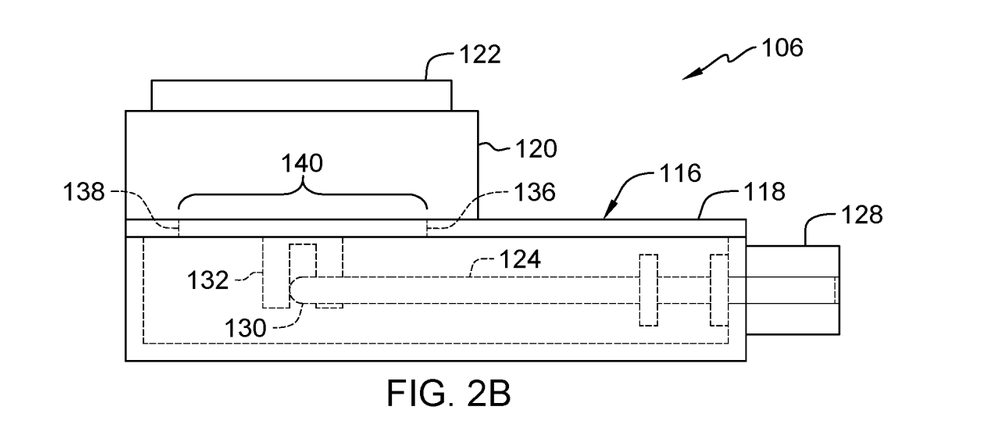
FIG. 2B depicts a side view of an electronically adjustable attenuation wrap plug in an undeformed state, in accordance with an embodiment of the present disclosure.

FIG. 2A depicts a 3-dimensional view of an electronically adjustable attenuation wrap plug in an undeformed state, in accordance with an embodiment of the present disclosure. FIG. 2B depicts a side view of an electronically adjustable attenuation wrap plug in an undeformed state, in accordance with an embodiment of the present disclosure. FIGS. 2A and 2B will be discussed concurrently.

In the illustrated embodiment, wrap plug 106 includes housing 116 which consists of fiber portion 118, actuator portion 120, and wireless portion 122. Fiber portion 118 includes a cavity into which optical fiber 124 extends. A first end of optical fiber 124 is electrically/optically connected to input prong 126 for coupling to output 110 of optical port 104 (previously discussed with regards to FIG. 1A), and a second end of optical fiber 124 is electrically/optically connected to output prong 128 for coupling to input 108 of optical port 104 (previously discussed with regards to FIG. 1A). Apex 130 of optical fiber 124 is disposed in the middle of an arm which protrudes from actuator portion 120 which is, for example, fork 132. Fork 132 is connected to an actuator module (not shown) that is positioned in actuator portion 120. The actuator moves fork 132 in a linear fashion towards or away from inlet prong 126 and outlet prong 128. The actuator module can be of any suitable type, such as, for example, a linear actuator, a solenoid, a shape-memory alloy, or a rack and pinion gear. If appropriate, a battery (not shown) can be connected to the actuator module as a power supply, and the battery can also provide power to other components of wrap plug 106 as appropriate.

In the undeformed state (as shown in FIG. 2A), undeformed bend radius 134 represents a radius at which optical fiber 124 would experience the least amount of attenuation when a signal is passed through output prong 128 and input prong 126. Fork 132 is positioned between first end stop 136 and second end stop 138 along linear path 140. The actuator module is configured to move fork 132 towards second end stop 138 resulting in optical fiber 124 being pulled and deformed such that bend radius 134 is reduced. This increases the amount of attenuation when a signal is passed through optical fiber 124 relative to the illustrated, undeformed state. The actuator module is also configured to move fork 132 towards first end stop 136 resulting in optical fiber 124 being pushed and deformed, creating two additional bend radii that decrease in size as fork 132 moves towards first end stop 136. This increases the amount of attenuation when a signal is passed through optical fiber 124 relative to the illustrated undeformed state. This configuration can also increase the amount of attenuation when a signal is passed through optical fiber 124 relative to the configuration wherein fork 132 is positioned against second end stop 138.

In the illustrated embodiment of FIGS. 2A and 2B, wireless portion 122 is connected to the top of actuator portion 120. Wireless portion 122 can include a wireless module including a transceiver that communicates, for example, using radio-frequency identification (RFID), near-field communication (NFC), Bluetooth®, or Wi-Fi™, and a power supply, such as a battery. The wireless module allows wrap plug 106 to communicate with other devices, such as end product 100 (shown in FIG. 3). Thereby, the attenuation of wrap plug 106 can be controlled remotely by sending commands to the wireless module that include instructions for the actuator module to move fork 132.

Figure 3:
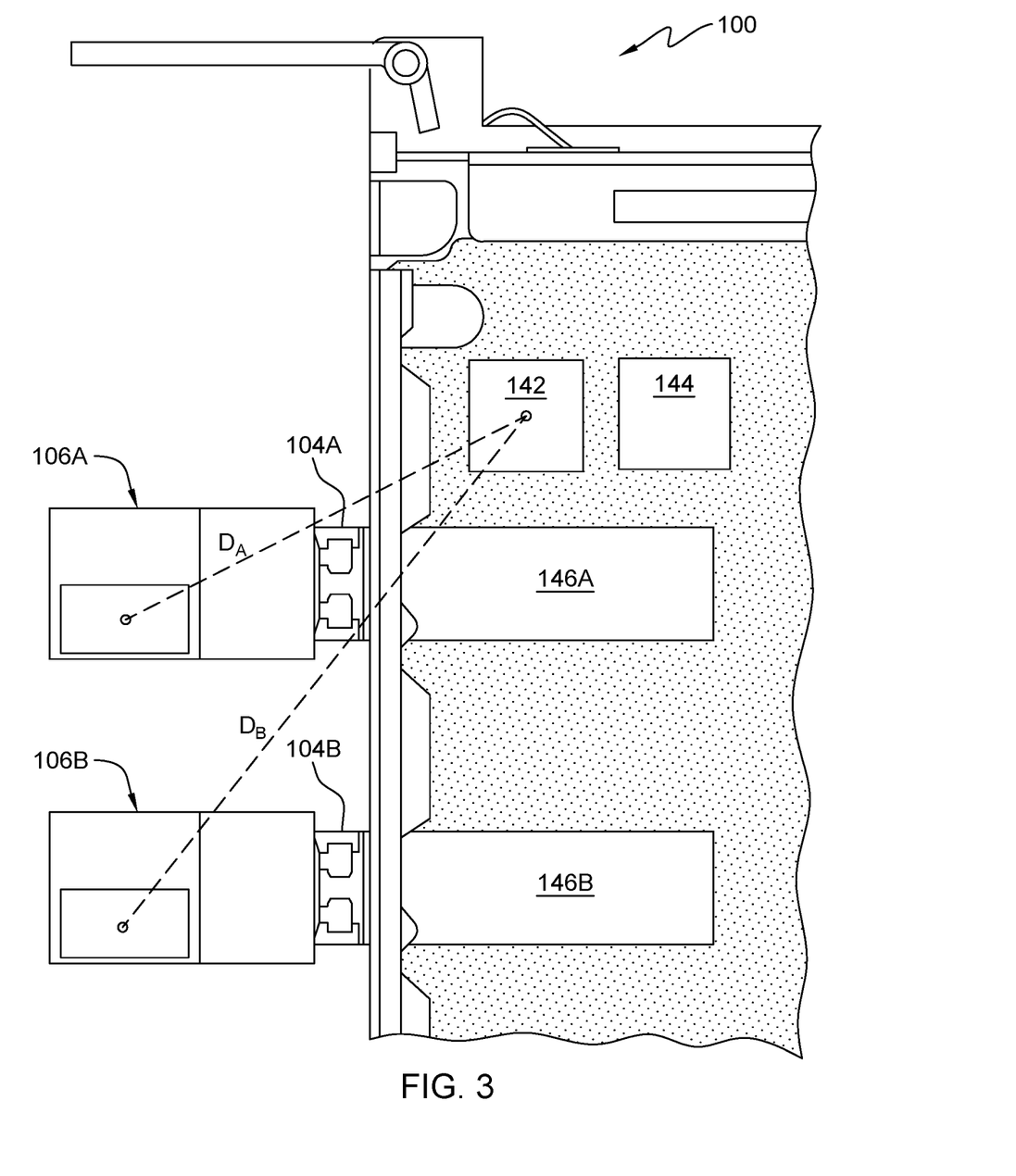
FIG. 3 depicts a side view of two adjustable attenuation wrap plugs installed on an end product, in accordance with an embodiment of the present disclosure.

FIG. 3 depicts a side view of two adjustable attenuation wrap plugs installed on an end product, in accordance with an embodiment of the present disclosure. In the illustrated embodiment, end product 100 is in the form of an input/output (I/O) card containing a printed circuit board (PCB) card in a pluggable cassette that inserts into a server, and wrap plugs 106A and 106B are plugged in to optical ports 104A and 104B of end product 100, respectively. End product 100 also includes wireless module 142, switch 144, and transceivers 146A and 146B. Switch 144 can activate and deactivate wireless module 142, for example, by selectively controlling electrical power to wireless module 142. Wireless module 142 can communicate with, for example, the wireless modules of wrap plugs 106A and/or 106B to control their attenuations.

If only one wrap plug 106 was in one of ports 104A and 104B, then end product 100 can determine which port 104A or 104B that wrap plug 106 is in by sending signals out of transceivers 146A and 146B. Whichever transceiver 146A or 146B receives a signal back is determined to be the one where wrap plug 106 is plugged in. However, if there are multiple wrap plugs 106 plugged in to end product 100, this method may be less advantageous. While a user can populate a database that correlates wrap plugs 106 with transceivers 146, such a method can take up time and can introduce errors. Instead, wireless module 142 can be used to determine which of wrap plugs 106A and 106B are in which of optical ports 104A and 104B. This determination can occur using a database of positions of optical ports 104 (e.g., optical ports 104A and 104B) on end product 100. More specifically, the database can include the distances or relative distances from wireless module 142 to where the wireless modules of wrap plugs 106A and 106B would be. The database can also include information regarding materials and/or obstructions that could impact the distance measured between wireless module 142 and where the wireless modules of wrap plugs 106A and 106B would be.

The database can be used with various techniques to determine the distance to a particular wrap plug 106. Subsequently, the distance information that can be used (e.g., along with the database) to determine which optical port 104A and 104B each wrap plug 106A and 106B is in. For example, wireless module 142 can ping both wrap plugs 106A and 106B requesting, for example, their serial numbers or internet protocol address. Then, the fastest response will be determined to be in port 104A because it is nearest to wireless module 142. For another example, an additional database of the wireless transmission power of wrap plugs 106 can be created, and the power of the returned signals from wrap plugs 106A and 106B can be compared to their original stated power levels. Then, the Friis transmission equation can be used to determine the distances $D_A$ and $D_B$ from each of wrap plugs 106A and 106B to wireless module 142, respectively. Specifically, the Friis transmission equation is as follows:

$$D = \frac{\lambda}{4\pi\sqrt{\frac{P_t}{P_r G_t G_r}}}$$

D is the distance between wireless modules
$\lambda$ is the wavelength of the radio frequency (e.g., 22.21 m for NFC)
$P_t$ is the power transmitted
$P_r$ is the power received
$G_t$ is the gain of the transmitting antenna
$G_r$ is the gain of the receiving antenna Alternatively, the ping from wireless module 142 can include requests for both serial number and transmission power from each wrap plug 106. In either of these power-based techniques, intervening materials and/or obstructions can be factored into the distance calculations. Furthermore, the database of positions of optical ports 104 can extend beyond a single end product 100, for example, to include every end product 100 present in a given server or server rack. Thereby, the positions of wrap plugs 106 in multiple end products 100 can be analyzed simultaneously.

Once the positions of wrap plugs 106A and 106B are determined, end product 100 can be tested. The testing can occur according to a test program wherein wrap plugs 106A and 106B are individually commanded (e.g., using their serial numbers or wireless IDs) to set their attenuations to varying levels while end product transmits and receives signals using transceivers 146A and 146B. The testing of end product 100 can be performed, for example, during the development stages of the design for end product 100. In addition or in the alternative, the testing can occur on some or all of the manufactured end products 100.

In some embodiments, after the testing is complete and wrap plugs 106 are no longer needed, wireless module 142 and/or switch 144 can be removed from end product 100 (e.g., not populated on a production level product). In some alternate embodiments, modules 142 and 144 are left in end product 100 (e.g., present on all products whether it is a test vehicle or production level product) and module 144 switches off module 142 in a production environment to save power and reduce electromagnetic emissions. However, in some alternate embodiments, wireless module 142 and switch 144 are not present on end product 100 at any time, but are instead present on another device, such as a laptop, tablet, or smartphone. This other device can also be communicatively connected to end product 100, such that the testing of end product 100 (including the adjustment of wrap plugs 106) can be performed.

The components and configuration of end product 100 and wrap plugs 106 allow for end product 100 to be tested at different attenuation levels without needed wrap plugs 106 to be swapped in and out (as is the case with fixed attenuation wrap plugs). In addition, multiple transceivers 146 can be tested simultaneously as wrap plugs 106 can be commanded and adjusted individually.

Figure 4:
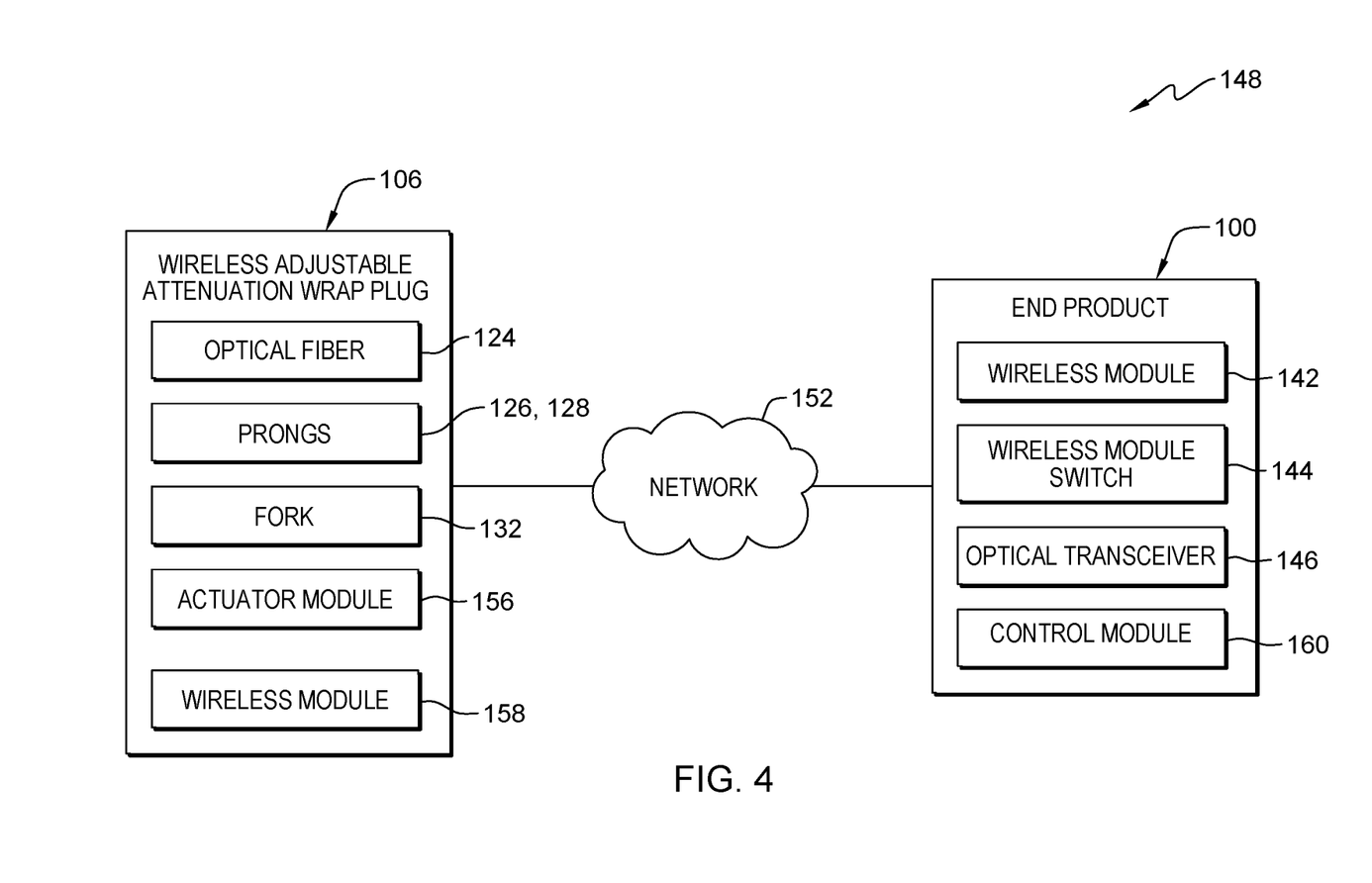
FIG. 4 depicts a schematic view of an electronically adjustable attenuation wrap plug wirelessly connected to an end product, in accordance with an embodiment of the present disclosure.

FIG. 4 depicts a schematic view of an electronically adjustable attenuation wrap plug wirelessly connected to an end product, in accordance with an embodiment of the present disclosure. In the illustrated embodiment, computing environment 148 includes end product 100, one or more wrap plugs 106 (although only one is shown), and network 152.

End product 100 includes wireless module 142, switch 144, one or more transceivers 146, and control module 160. Wrap plug 106 includes optical fiber 124, prongs 126, 128, fork 132, actuator module 156, and wireless module 158. Other components can be present in end product 100, wrap plug 106, and network 152, such as, for example, some or all of the components in the computer system discussed later with respect to FIG. 8.

End product 100 and wrap plug 106 are wirelessly connected via network 152, for example, using radio-frequency identification (RFID), near-field communication (NFC), Bluetooth®, or Wi-Fi™. Thereby, a user can use end product 100 to generate or download a testing program for use with end product 100 and wrap plug 106. This testing program can be stored on end product 100, and the test program can be carried out with the wrap plug(s) 106 remaining in place since wrap plug(s) 106 can provide every level of attenuation needed during testing.

Figure 5:
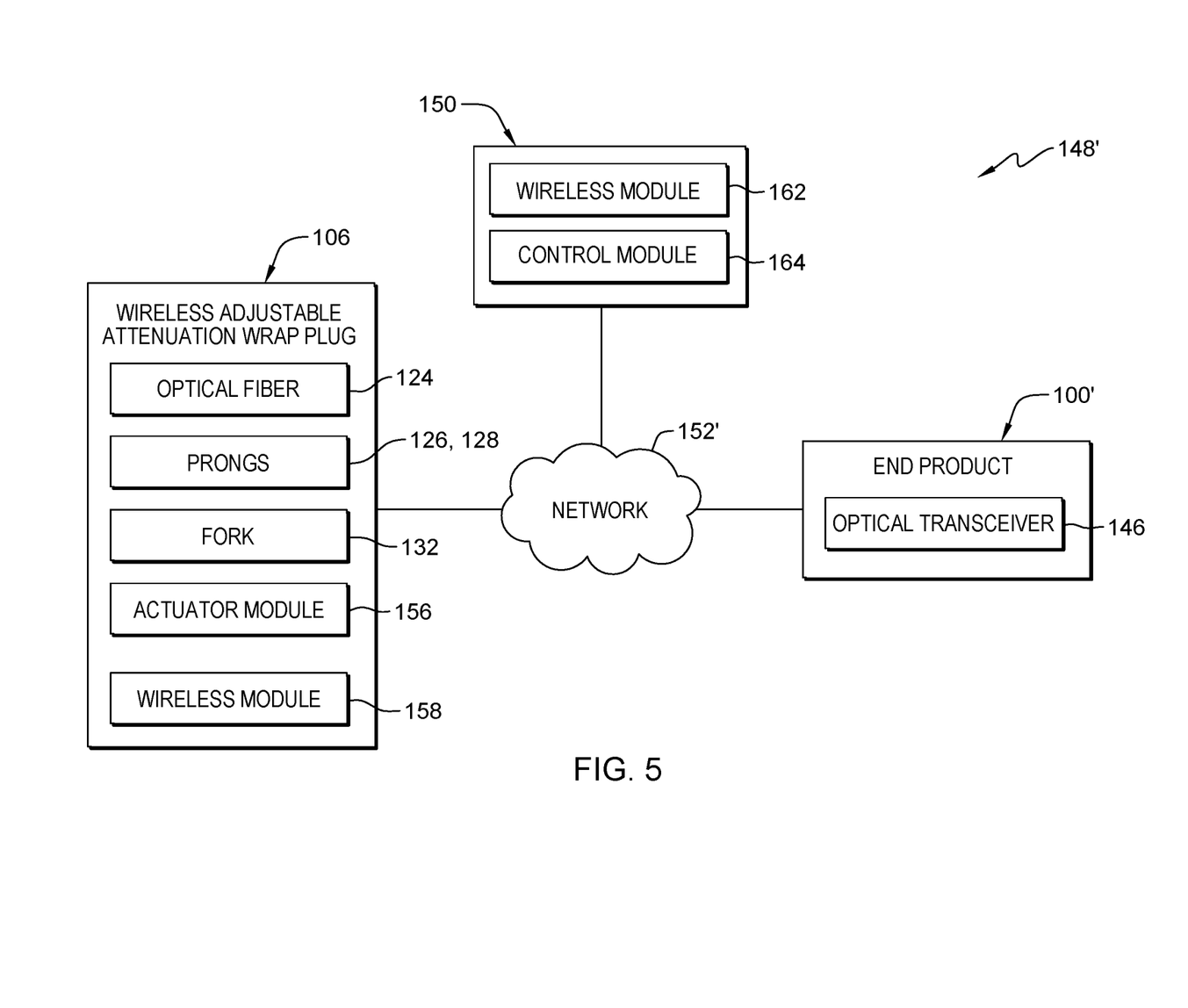
FIG. 5 depicts an alternate embodiment schematic view of an electronically adjustable attenuation wrap plug wirelessly connected to an end product, in accordance with an embodiment of the present disclosure.

FIG. 5 depicts an alternate embodiment schematic view of an electronically adjustable attenuation wrap plug wirelessly connected to an end product, in accordance with an embodiment of the present disclosure. In the illustrated embodiment, computing environment 148' includes end product 100', one or more wrap plugs 106 (although only one is shown), device 150, and network 152'.

End product 100' includes one or more transceivers 146, and wrap plug 106 includes optical fiber 124, prongs 126, 128, fork 132, actuator module 156, and wireless module 158. Device 150 includes wireless module 162 and control module 164. Other components can be present in end product 100', wrap plug 106, device 150, and network 152', such as, for example, some or all of the components in the computer system discussed later with respect to FIG. 8.

End product 100', wrap plug 106, and device 150 are wirelessly connected via network 152', for example, using radio-frequency identification (RFID), near-field communication (NFC), Bluetooth®, or Wi-Fi™. Thereby, a user can use device 150 to generate or download a testing program for use with end product 100' and wrap plug 106, and this testing program can be stored on device 150. In some embodiments, device 150 can directly instruct end product 100' to start the testing. Then, end product 100' can communicate directly with wrap plug 106 to instruct it through each step of the testing. In other embodiments, device 150 can communicate directly with end product 100' and directly with wrap plug 106 to instruct them through each step of the testing. In either set of embodiments, the test program can be carried out with the wrap plug(s) 106 remaining in place since wrap plug(s) 106 can provide every level of attenuation needed during testing.

Figure 6:
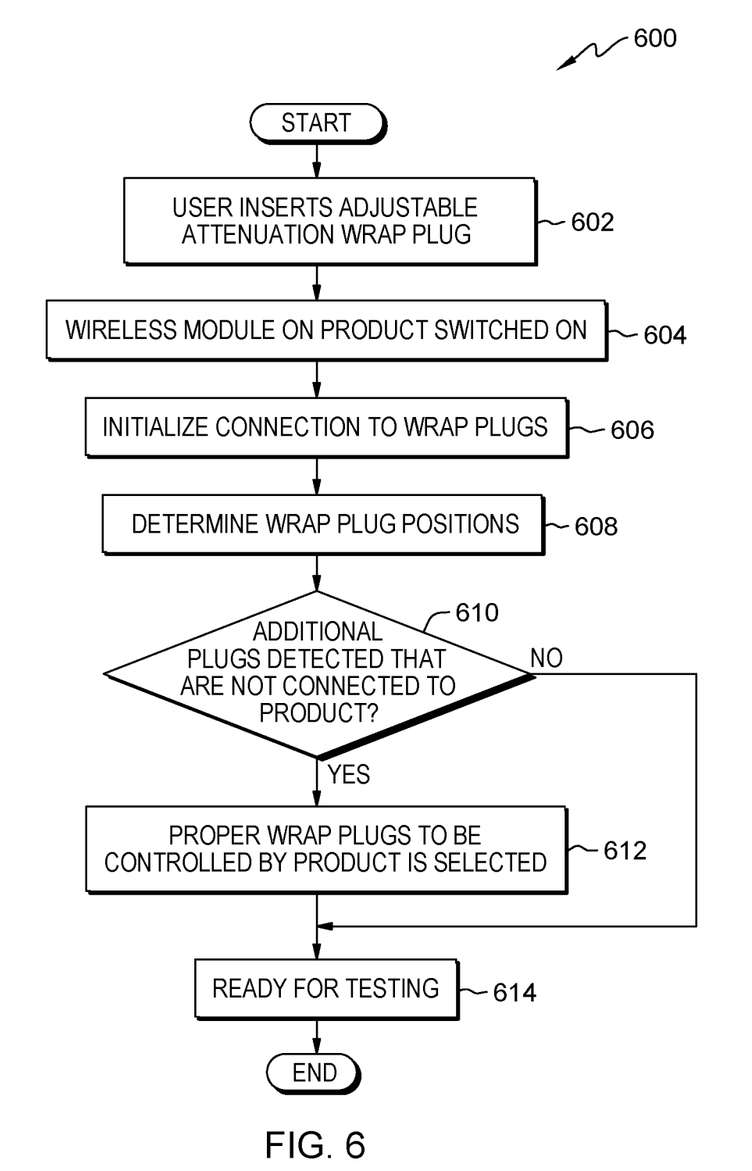
FIG. 6 is a flowchart depicting operational steps for wirelessly connecting an electronically adjustable attenuation wrap plug with an end product, in accordance with an embodiment of the present disclosure.

FIG. 6 is a flowchart depicting operational steps for wirelessly connecting an electronically adjustable attenuation wrap plug with an end product, in accordance with an embodiment of the present disclosure. During the discussion of FIG. 6, references may be made to the features of FIGS. 1-5, so the corresponding reference numerals may be used.

To wirelessly connect end product 100 to wrap plugs 106A and 106B in method 600, the user inserts wrap plugs 106A and 106B into end product 100 at block 602. At block 604, wireless module 142 is turned on by switch 144, and a wireless connection is initialized between end product 100 and any nearby wrap plugs 106 at block 606. At block 608, the connected wrap plugs 106 are pinged by end product 100 to determine their positions. If additional wrap pugs 106 that are not connected to end product 100 are detected at 610, only the wrap plugs 106 that are connected to end product 100 are selected to be communicated with, at block 612. In this case, only wrap plugs 106A and 106B are connected to end product 100 while the other detected wrap plugs are flagged (and not controlled in the test program), so end product 100 is ready for testing with wrap plugs 106A and 106B at block 614.

Figure 7:
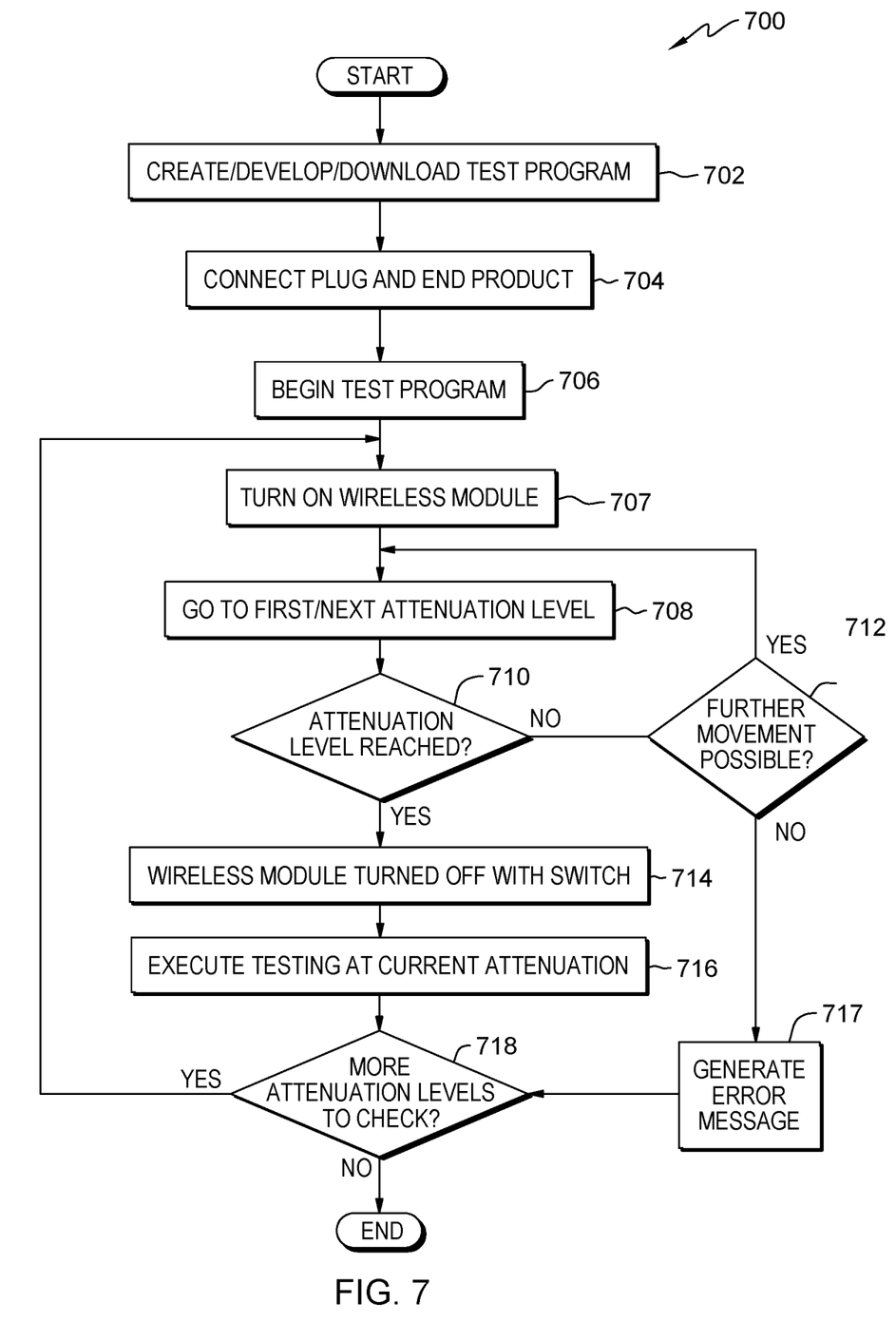
FIG. 7 is a flowchart depicting operational steps for cycling through a plurality of attenuation levels in a test program, in accordance with one embodiment of the present disclosure.

FIG. 7 is a flowchart depicting operational steps for cycling through a plurality of attenuation levels in a test program, in accordance with one embodiment of the present disclosure. During the discussion of FIG. 7, references may be made to the features of FIGS. 1-6, so the corresponding reference numerals may be used.

To execute a test program with end product 100 and wrap plug 106A in method 700, a test program is created, developed, and/or downloaded by a user, and the test program is transferred onto device 150 and/or end product 100 at block 702. At block 704, end product 100 and wrap plug 106A are connected, for example, using method 500. At block 706, the test program is initiated.

At block 707, wireless module 142 is turned on by switch 144. At block 708, wrap plug 106A is commanded to move to the first attenuation level which can be in the form of, for example, a position of fork 132 or a simulated fiber optic transmission distance. At block 710, whether wrap plug 106A has achieved the first attenuation level is determined, for example, by sending and receiving a test signal via transceiver 146A. Block 710 can be determined using a tolerance range, such as +/−5% of the desired attenuation level. If not ("NO" at block 710), it is determined whether further movement of fork 132 by actuator module 156 is possible at block 712. If so ("YES" at block 712), then method returns to block 708, for example, to fine tune the attenuation of wrap plug 106A. If not ("NO" at block 712), then method advances to block 717 wherein an error message is generated for the user. Such an error message, for example, can be recorded in an operational log or it can be transient, such as a light (not shown) on wrap plug 106 that illuminates.

Once the first attenuation level is achieved ("YES" at block 710), wireless module 142 can be turned off by switch 144 to conserve power at block 614. At block 716, the portion of the test program that occurs at the first attenuation level is executed. At block 718, it is determined whether there are more attenuation levels to check. If so ("YES" at block 718), then method 700 returns to block 707 where wireless module 142 is turned on by switch 144, and then method 700 continues to block 708 where wrap plug 106A is commanded to move to the next attenuation level in the test program.

If not ("NO" at block 718), then the test program has been completed and method 700 ends. While method 700 has been described using only wrap plug 106A, method 700 can be performed on multiple wrap plugs 106 simultaneously or in series. In such embodiments, end product 100 and/or device 150 could communicate with each wrap plug 106 using a unique identifier to set different attenuation levels. In other such embodiments, end product 100 and/or device 150 could communicate with all wrap plugs 106 to synchronize the switching of the different attenuation levels.

Figure 8:
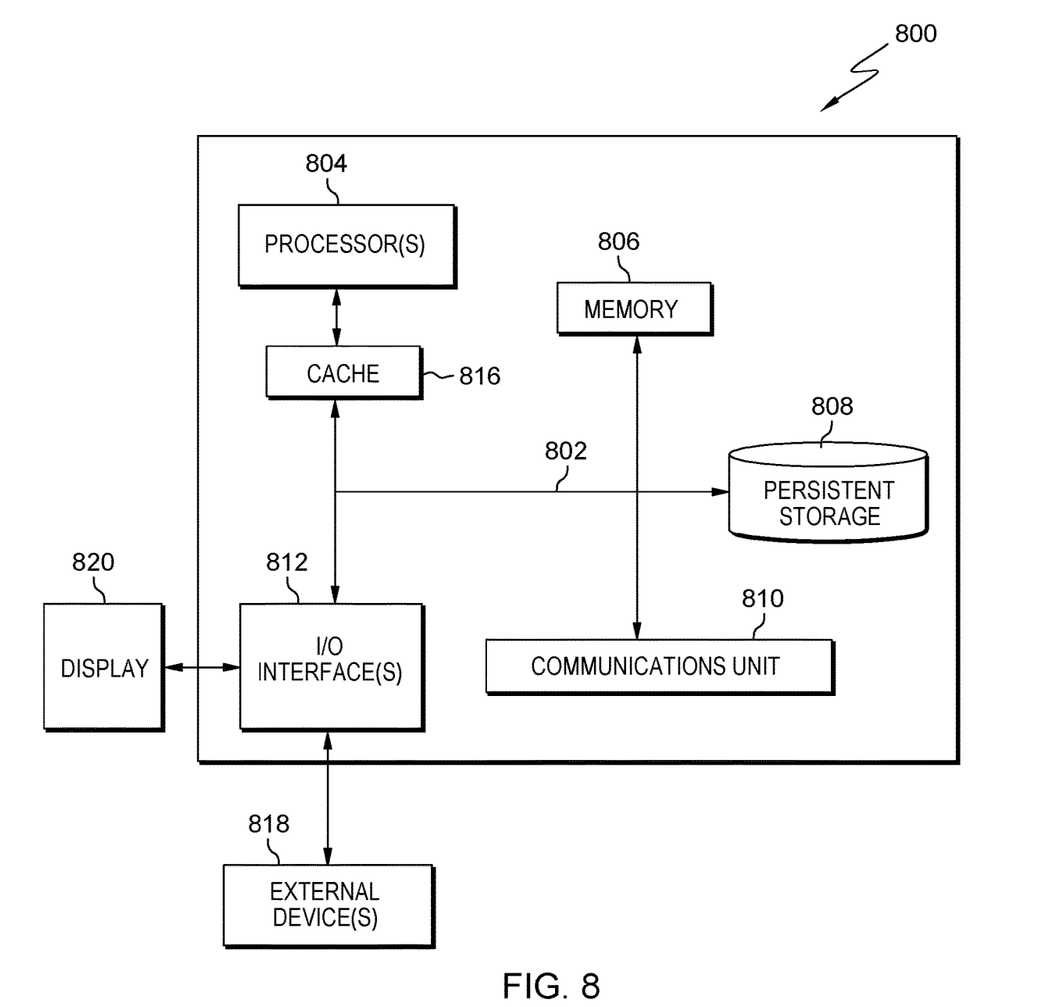
FIG. 8 depicts a block diagram of components of a computer system for performing the operational steps of the test program, in an embodiment, in accordance with one embodiment of the present disclosure.

FIG. 8 depicts a block diagram of components of a computer system for performing the operational steps of the test program, in an embodiment, in accordance with the present disclosure. Computer system 800 can represent, for example, end product 100 and/or device 150 (shown in FIG. 5) either of which can include the test program which is performed by end product 100 and wrap plug(s) 106. The computer system includes processors 804, cache 816, memory 806, persistent storage 808, communications unit 810, input/output (I/O) interface(s) 812 and communications fabric 802. Communications fabric 802 provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications, and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present disclosure may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present disclosure may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present disclosure can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. It is therefore intended that the present disclosure not be limited to the exact forms and details described and illustrated but fall within the scope of the appended claims.

What is claimed is:

1. A method of using a first adjustable attenuation fiber optic wrap plug ("AAFOWP"), the method comprising:
receiving initial data into a wireless module of the first AAFOWP, wherein the initial data corresponds to an initial desired attenuation level that the first AAFOWP is to achieve; and
moving, in response to receiving the initial data, an arm by an actuator to change a bend radius of an optical fiber wrap in the first AAFOWP, thus adjusting an attenuation through the first AAFOWP to the initial desired attenuation level.

2. The method of claim 1, wherein the first AAFOWP is plugged into an end product, the method further comprising:
sending the initial data by the end product.

3. The method of claim 1, wherein the first AAFOWP is plugged into an end product, the method further comprising:
sending the initial data by a computing device that is communicatively connected to the first AAFOWP and/or the end product.

4. The method of claim 3, wherein the computing device sends the initial data directly to the wireless module of the first AAFOWP.

5. The method of claim 1, further comprising:
receiving subsequent data into the wireless module of the first AAFOWP, wherein the subsequent data corresponds to a subsequent desired attenuation level that the first AAFOWP is to achieve;
moving, in response to receiving the subsequent data, an arm by the actuator to change the bend radius of an optical fiber wrap in the first AAFOWP, thus adjusting the attenuation through the first AAFOWP to the subsequent desired attenuation level;
wherein the subsequent data comprises a plurality of desired attenuation levels that the first AAFOWP proceeds through to complete a test program.

6. The method of claim 1, wherein the first AAFOWP is plugged into a first optical transceiver of an end product, the method further comprising:
plugging a second AAFOWP into a second optical transceiver of the end product.

7. A method of using a first fiber optic wrap plug ("FOWP"), the method comprising:
measuring a first distance between a controlling wireless module and a first FOWP wireless module; and
determining a first transceiver into which the first FOWP is plugged into based on the first distance and a database of transceiver positions.

8. The method of claim 7, wherein the first FOWP is an adjustable attenuation fiber optic wrap plug ("AAFOWP").

9. The method of claim 8, further comprising:
sending data to the first FOWP that corresponds to an initial desired attenuation level that the first FOWP is to achieve; and
sending a test signal through the first FOWP to determine if the initial desired attenuation level has been achieved.

10. The method of claim 7, further comprising:
measuring a second distance between the controlling wireless module and a second FOWP wireless module;
determining a second transceiver into which a second FOWP is plugged into based on the second distance and the database of transceiver positions;
testing the second transceiver using the second FOWP.

11. The method of claim 7, wherein measuring the first distance is selected from the group consisting of: measuring a time of a response of the first FOWP and measuring a power of the response of the first FOWP.

12. The method of claim 11, wherein measuring the first distance comprises receiving information related to the first FOWP in a response from the first FOWP.

13. The method of claim 11, wherein measuring the first distance further comprises comparing a response from the first FOWP to a database selected from the group consisting of: FOWP wireless response times, FOWP wireless response powers, FOWP serial numbers, and end product transceiver positions.

14. An adjustable attenuation fiber optic wrap plug ("AA-FOWP") apparatus comprising:
   a first optical fiber port;
   a second optical fiber port;
   an optical fiber wrap extending between the first optical fiber port and the second optical fiber port;
   an optical fiber movement arm in contact with the optical fiber wrap;
   an actuator module connected to the optical fiber movement arm; and
   a first wireless module communicatively connected to the actuator module;
   wherein the first wireless module receives data corresponding to a desired attenuation level the adjustable attenuation fiber optic wrap plug apparatus is to achieve;
   wherein the actuator module changes a position of the optical fiber movement arm; and
   wherein changes to a position of the optical fiber movement arm change a bend radius of the optical fiber wrap thus adjusting an attenuation between the first optical fiber port and the second optical fiber port.

15. The AAFOWP apparatus of claim 14, wherein the AAFOWP is plugged into an end product, wherein the end product comprises:
   a second wireless module;
   a wireless module switch;
   an optical transceiver;
   a first end product port configured to connect to the first optical fiber port; and
   a second end product port configured to connect to the second optical fiber port.

16. The AAFOWP apparatus of claim 15, wherein the first wireless module receives the data from the end product.

17. The AAFOWP apparatus of claim 15, wherein the end product includes a plurality of optical transceivers.

18. The AAFOWP apparatus of claim 17, wherein a plurality of AAFOWP apparatuses are plugged into the end product.

19. The AAFOWP apparatus of claim 14, wherein the first wireless module receives the data from a control device that is separate from an end product into which the AAFOWP is plugged.

20. The AAFOWP apparatus of claim 19, wherein the control device is communicatively connected to the end product.

* * * * *